United States Patent [19]

Iu

[11] Patent Number: 5,251,028
[45] Date of Patent: Oct. 5, 1993

[54] APPARATUS FOR REDUCING QUANTIZATION ARTIFACTS IN AN INTERFRAME HYBRID CODING SYSTEM WITH MOTION COMPENSATION

[75] Inventor: Siu-Leong Iu, Bensalem, Pa.

[73] Assignee: Matsushita Electric Corporation of America, Secaucus, N.J.

[21] Appl. No.: 742,397

[22] Filed: Aug. 8, 1991

[51] Int. Cl.$^5$ .............................................. H04N 7/12
[52] U.S. Cl. .................................... 358/133; 358/136; 358/105
[58] Field of Search ................. 358/133, 135, 136, 105

[56] References Cited

U.S. PATENT DOCUMENTS

| | | | |
|---|---|---|---|
| 4,833,535 | 5/1989 | Ozeki et al. | 358/135 |
| 4,972,260 | 11/1990 | Fujikawa et al. | 358/105 |
| 5,025,482 | 6/1992 | Maurakami et al. | 358/135 |
| 5,111,294 | 5/1992 | Asai et al. | 358/105 |
| 5,113,256 | 5/1992 | Citta et al. | 358/136 |

OTHER PUBLICATIONS

"MPEG Video Simulation Model Three (SM3)," Simulation Model Editorial Group, Jul. 25, 1990.
"Advanced Digital Television Description" by The Advanced Television Research Consortium: David Sarnoff Research Center, NBC, North American Philips, and Thomson Consumer Research, Feb. 27, 1991.
"On Comparing Motion-Interpolation Structures for Video Coding," A. Puri and R. Aravind: Visual Communications and Image Processing '90 SPIE vol. 1360, pp. 1560-1571.
"Video Coding with Motion-Compensated Interpolation for CD-ROM Applications," A. Puri, R. Aravind, B. G. Haskell, and R. Leonardi, Signal Processing: Image Communication 2 (1990), pp. 127-144.
"Moving Picture Coding System for Digital Storage Media Using Hybrid Coating," Atsushi Narata et al., Signal Processing & Image Communication 2 (1990) pp. 109-116.

Primary Examiner—Alvin L. Oberley
Assistant Examiner—Minsun Oh
Attorney, Agent, or Firm—Ratner & Prestia

[57] ABSTRACT

Apparatus for reducing halos at moving edges adjacent flat areas in successive images produced by a system using differential pulse code modulation with motion compensation in which the output of a DCT is quantized by reducing the size of the quantization steps in those areas of the image which are indicated as containing such moving edges adjacent flat areas.

19 Claims, 16 Drawing Sheets

| 100 | 102 | 104 |
|---|---|---|
| 112 | CURRENT DATA BLOCK ⌐98 | 105 |
| 110 | 108 | 106 |

FIG. 9

Fine step size table
```
1 1 1 1 1 1 1 1 1 1 1 1
1 1 1 1 1 1 1 1 1 1 1 1
1 1 1 1 1 1 1 1 1 1 1 1
1 1 1 1 1 1 1 1 1 1 1 1
1 1 1 1 1 1 1 1 1 1 1 1
1 1 1 1 1 1 1 1 1 1 1 1
1 1 1 1 1 1 1 1 1 1 1 1
1 1 1 1 1 1 1 1 1 1 1 1
1 1 1 1 1 1 1 1 1 1 1 1
1 1 1 1 1 1 1 1 1 1 1 1
1 1 1 1 1 1 1 1 1 1 1 1
1 1 1 1 1 1 1 1 1 1 1 1
```

FIG. 10

A = input block
```
100 100 100 100 100 100 100 100 100 100 100 100
100 100 100 100 100 100 100 100 100 100 100 100
100 100 100 100 100 100 100 100 100 100 100 200
100 100 100 100 100 100 100 100 100 100 200 200
100 100 100 100 100 100 100 100 100 200 200 200
100 100 100 100 100 100 100 100 200 200 200 200
100 100 100 100 100 100 100 200 200 200 200 200
100 100 100 100 100 100 200 200 200 200 200 200
100 100 100 100 100 200 200 200 200 200 200 200
100 100 100 100 200 200 200 200 200 200 200 200
100 100 100 200 200 200 200 200 200 200 200 200
100 100 200 200 200 200 200 200 200 200 200 200
```

FIG. 11

B = best matching block
```
100 100 100 100 100 100 100 100 100 200 200 200
100 100 100 100 100 100 100 100 200 200 200 200
100 100 100 100 100 100 100 200 200 200 200 200
100 100 100 100 100 100 200 200 200 200 200 200
100 100 100 100 100 200 200 200 200 200 200 200
100 100 100 100 200 200 200 200 200 200 200 200
100 100 100 200 200 200 200 200 200 200 200 200
100 100 200 200 200 200 200 200 200 200 200 200
100 200 200 200 200 200 200 200 200 200 200 200
200 200 200 200 200 200 200 200 200 200 200 200
200 200 200 200 200 200 200 200 200 200 200 200
200 200 200 200 200 200 200 200 200 200 200 200
```

FIG. 12

C = A−B $$\begin{bmatrix} 0 & 0 & 0 & 0 & 0 & 0 & 0 & -100 \\ 0 & 0 & 0 & 0 & 0 & 0 & -100 & -100 \\ 0 & 0 & 0 & 0 & 0 & -100 & -100 & 0 \\ 0 & 0 & 0 & 0 & -100 & -100 & 0 & 0 \\ 0 & 0 & 0 & -100 & -100 & 0 & 0 & 0 \\ 0 & 0 & -100 & -100 & 0 & 0 & 0 & 0 \\ 0 & -100 & -100 & 0 & 0 & 0 & 0 & 0 \\ -100 & -100 & 0 & 0 & 0 & 0 & 0 & 0 \end{bmatrix}$$

FIG. 13

D = DCT of C $$\begin{bmatrix} -46.88 & -4.33 & 4.08 & -3.67 & 3.13 & -2.46 & 1.69 & -0.86 \\ -4.33 & 42.08 & 9.64 & -5.10 & 5.05 & -3.41 & 2.56 & -1.20 \\ 4.08 & 9.64 & -37.34 & -13.47 & 4.08 & -4.93 & 2.21 & -1.53 \\ -3.67 & -5.10 & -13.47 & 30.25 & 15.53 & -2.89 & 4.24 & -1.01 \\ 3.13 & 5.05 & 4.08 & 15.53 & -21.88 & -15.29 & 1.69 & -2.73 \\ -2.46 & -3.41 & -4.93 & -2.89 & -15.29 & 13.50 & 12.66 & -0.68 \\ 1.69 & 2.56 & 2.21 & 4.24 & 1.69 & 12.66 & -6.41 & -7.82 \\ -0.86 & -1.20 & -1.53 & -1.01 & -2.73 & -0.68 & -7.82 & 1.67 \end{bmatrix}$$

E = Quantizatized value of D

| -47 | -4 | 4 | -4 | 3 | -2 | 2 | -1 |
|---|---|---|---|---|---|---|---|
| -4 | 42 | 10 | -5 | 5 | -3 | 3 | -1 |
| 4 | 10 | -37 | -13 | 4 | -5 | 2 | -2 |
| -4 | -5 | -13 | 30 | 16 | -3 | 4 | -1 |
| 3 | 5 | 4 | 16 | -22 | -15 | 2 | -3 |
| -2 | -3 | -5 | -3 | -15 | 14 | 13 | -1 |
| 2 | 3 | 2 | 4 | 2 | 13 | -6 | -8 |
| -1 | -1 | -2 | -1 | -3 | -1 | -8 | 2 |

FIG. 14

F = Inverse DCT of E

| 2.95 | -0.51 | 0.22 | 1.00 | -2.30 | 0.43 | -100.60 | -100.35 |
|---|---|---|---|---|---|---|---|
| -0.51 | 0.21 | -0.54 | -2.01 | -0.67 | -100.30 | -98.70 | 0.57 |
| 0.22 | -0.54 | 3.46 | 1.53 | -99.71 | -99.52 | -0.17 | -0.75 |
| 1.00 | -2.01 | 1.53 | -98.41 | -101.43 | 1.47 | 0.50 | 0.42 |
| -2.30 | -0.67 | -99.71 | -101.43 | 0.62 | -0.99 | -0.11 | -0.93 |
| 0.43 | -100.30 | -99.52 | 1.47 | -0.99 | -2.23 | -1.16 | 1.40 |
| -100.60 | -98.70 | -0.17 | 0.50 | -0.11 | -1.16 | -0.63 | -0.75 |
| -100.35 | 0.57 | -0.75 | 0.42 | -0.93 | 1.40 | -0.75 | -1.97 |

FIG. 15

G = B+F (reconstruction), round to integer

| 103 | 99  | 100 | 101 | 98  | 100 | 99  | 100 |
|-----|-----|-----|-----|-----|-----|-----|-----|
| 99  | 100 | 99  | 98  | 99  | 100 | 101 | 201 |
| 100 | 99  | 103 | 102 | 100 | 100 | 200 | 199 |
| 101 | 98  | 102 | 102 | 99  | 201 | 200 | 200 |
| 98  | 99  | 100 | 99  | 201 | 199 | 200 | 199 |
| 100 | 100 | 100 | 201 | 199 | 198 | 199 | 201 |
| 99  | 101 | 200 | 200 | 200 | 199 | 199 | 199 |
| 100 | 201 | 199 | 200 | 199 | 201 | 199 | 198 |

FIG. 16

H = A−G (difference of input block and reconstruction)

| -3 | 1  | -0 | -1 | 2  | -0 | 1  | 0  |
|----|----|----|----|----|----|----|----|
| -1 | -0 | 1  | -2 | -0 | -1 | -1 | -1 |
| -0 | 1  | -3 | -2 | -1 | 0  | 0  | 0  |
| -1 | 2  | -2 | -2 | 1  | -1 | -0 | 1  |
| 2  | 1  | -0 | -1 | -1 | 2  | -0 | -1 |
| -0 | 0  | -0 | -0 | 0  | 1  | 1  | 1  |
| -1 | -1 | 0  | -0 | 1  | 1  | 1  | 1  |
| 0  | -1 | 1  | -0 | -1 | -1 | 1  | 2  |

Coarse step size table
```
5 5 5 5 5 5 5 5
5 5 5 5 5 5 5 5
5 5 5 5 5 5 5 5
5 5 5 5 5 5 5 5
5 5 5 5 5 5 5 5
5 5 5 5 5 5 5 5
5 5 5 5 5 5 5 5
5 5 5 5 5 5 5 5
```

FIG. 19

E = Quantizatized value of D
```
-45   -5    5   -5    5    0    0    0
 -5   40   10   -5    5   -5    5   -5
  5   10  -35  -15   15    5    0    0
 -5   -5  -15   30  -20   -5    5    0
  5    5    5   15  -15  -15   15   -5
  0   -5   -5   -5    0   15   15  -10
  0    0    5    0    5   -5   -5    0
  0    0    0    0    0    0  -10    0
```

FIG. 20

F = Inverse DCT of E
```
  0.94   -1.05    3.51    1.84    1.20   -4.23  -96.68  -90.67
 -1.05   -3.38   -2.75   -9.98    8.32 -107.83  -97.98    7.48
  3.51   -2.75    2.41    3.43 -108.84  -94.95    5.09   -6.71
  1.84   -9.98    3.43  -91.49  -96.41    1.75    2.12   12.80
  1.20    8.32 -108.84  -96.41   -0.38    0.41    2.79   -3.42
 -4.23 -107.83  -94.95    1.75    0.41   -0.09   -6.94  -10.97
-96.68  -97.98    5.09    2.12    2.79   -6.94   11.77    8.64
-90.67    7.48   -6.71   12.80   -3.42  -10.97    8.64    0.22
```

G = B+F (reconstruction), round to integer

| | | | | | | | |
|---|---|---|---|---|---|---|---|
| 101 | 99 | 102 | 104 | 101 | 96 | 103 | 109 |
| 99 | 97 | 90 | 97 | 108 | 92 | 102 | 207 |
| 104 | 97 | 103 | 102 | 91 | 105 | 205 | 193 |
| 102 | 90 | 109 | 103 | 104 | 202 | 202 | 213 |
| 101 | 108 | 104 | 91 | 200 | 200 | 203 | 197 |
| 96 | 92 | 202 | 105 | 200 | 200 | 193 | 189 |
| 103 | 102 | 202 | 205 | 203 | 193 | 212 | 209 |
| 109 | 207 | 213 | 193 | 197 | 189 | 209 | 200 |

FIG. 21

H = A−G (difference of input block and reconstruction)

| | | | | | | | |
|---|---|---|---|---|---|---|---|
| −1 | 1 | −4 | −2 | −1 | 4 | −3 | −9 |
| 1 | 3 | 3 | 10 | −8 | 8 | −2 | −7 |
| −4 | 3 | −2 | −3 | 9 | −5 | −5 | 7 |
| −2 | 10 | −3 | −9 | −4 | −2 | −2 | −13 |
| −1 | −8 | 9 | −4 | 0 | 0 | −3 | 3 |
| 4 | 8 | −5 | −2 | 0 | 0 | 7 | 11 |
| −3 | −2 | −5 | −2 | −3 | 7 | −12 | −9 |
| −9 | −7 | 7 | −13 | 3 | 11 | −9 | −0 |

FIG. 22

APPARATUS FOR REDUCING QUANTIZATION ARTIFACTS IN AN INTERFRAME HYBRID CODING SYSTEM WITH MOTION COMPENSATION

BACKGROUND OF THE INVENTION

The availability of memories capable of storing frames of data used in television as well as other solid state digital devices has made it possible to convey images within present 6 MHz channels that have much higher definition than those currently available. It has been known for many years that the bit rate required for televising or otherwise conveying images could be significantly reduced by transmitting the differences between the signals for adjacent frames. After a first frame is transmitted, successive frames could be formed at the receiver by making changes in accordance with the transmitted frame to frame difference signals.

One problem with this approach is that any errors introduced by noise and other effects are accumulative. Furthermore, it is necessary to transmit a nearly complete frame when there is a great deal of motion in the scenes. Therefore, systems employing motion compensation were developed. The current frame is effectively divided up into a number of discrete areas called motion blocks, and motion vectors for the x, y movements required for a matching block in the last frame to reach the position of the motion block in the current frame are derived. The criteria for the selection of a matching block may be the mean square error or mean absolute difference. The search for a matching block is limited to a search area surrounding a block having the same position in the last frame that the motion block has in the current frame. These motion vectors are transmitted to the receiver with a very few extra bits. What is called a predicted frame is formed both at the receiver and the transmitter by rearranging the matching blocks of the last frame in accordance with the motion vectors. One might conclude that this would be all that is necessary, but the predicted frames at the receiver and the transmitter are only predictions and subject to error which could become accumulative.

Therefore, the differences between the current frame, which, of course, is only available at the transmitter, and the predicted frame at the transmitter are derived and transmitted to the receiver, and the image to be displayed at the receiver is formed by adding these transmitted differences to its predicted frame.

Whereas advantageous bit rate reduction is attained in this manner, further reduction has been attained by transmitting the difference signals in coded form. The frames of difference signals are divided into contiguous data blocks that may or may not be the same size as the motion blocks. The data blocks of the current frame and the predicted frame are scanned, and the signals from the predicted frame are subtracted from the signals from the current frame so as to derive difference signals. The difference signals are applied to means such as a Discrete Cosine Transform, DCT, for deriving coefficients corresponding to different frequencies that appear in positions in a coefficient block corresponding to the pixels in the data blocks. A DCT places a value equal to the average value of all the pixels in a block at the upper left, which is D.C. In going to the right, the coefficients are for increasing discrete horizontal frequencies and in going down, the coefficients are for increasing discrete vertical frequencies. Thus, the coefficients in zigzag diagonal paths from the block at the upper left to the block at the lower right are for increasing discrete frequencies. The highest discrete frequencies are located in the lower right corner of the coefficient block. If the pixels in the original image are each represented by eight bits, the pixels in the difference signals are represented by nine bits and form the input to the DCT processing. The DCT coefficients are usually represented by 10 bits with one extra bit to represent the sign. Thus, there is no reduction in bits and therefore no reduction in bit rate at this point. However, a property of the DCT is that it decorrelates pixels into coefficients in such a way that for a normal image, the DC coefficient and the low frequency coefficients have large values while the high frequency coefficients have small value or even zero value. This property of the DCT is very valuable in compressing the data rate, especially when followed by a quantizer which quantizes the DCT coefficients coarsely. Further bit rate reduction can be achieved by coupling a Huffman coder between the output of the quantizer and the encoder output.

Formation of the predicted frame at the transmitter is effected by applying motion compensation to the last frame as previously described, and the next image frame is formed by inversing the effects of the quantizer and the DCT on the difference signals so as to recover the difference signals and adding the result to the predicted frame. This is the new last frame and the same as the image that is produced at the receiver.

In the interframe hybrid coding system using motion compensation described above, the objective is to compress the number of bits representing the image as much as possible without introducing significant visible distortion in the coded image.

BRIEF SUMMARY OF THE INVENTION

In images formed by the system described above, applicant observed that there was significant visible distortion in the form of a halo along some boundaries when the number of bits representing an image were reduced as much as possible without causing visible distortion in other parts of the image. This distortion can be reduced by reducing the size of the quantization steps throughout the image, but this would greatly increase the number of bits required to represent the image, thus defeating the main purpose. After much observation, applicant discovered that the halo was only significantly noticeable in flat areas next to a moving edge.

It then occurred to applicant that the size of the quantizing steps could be reduced only when the halo effect is encountered as this would reduce the halo without significantly increasing the overall bit rate because this situation occurs infrequently. In accordance with a preferred form of this invention, therefore, a first indication is made when an edge is present in a data block, a second indication is made when a flat area is adjacent the edge and a third indication is made when the edge is in motion. When all three indications are present, the size of the quantization steps for DCT coefficients for the data block is reduced by an amount required to sufficiently reduce the halo effect.

If the noise in the image is very small, we can use a less preferred embodiment of the invention in which only the first indication of the presence of an edge and the second indication of the presence of an adjacent area in a data block are derived and the size of the quantization steps are reduced when both indications are present. The reason for this is that with low noise, the difference signals are small or zero for an edge that is not moving so that even the use of small quantization steps does not make a significant increase in the bit rate.

BRIEF DESCRIPTION OF THE DRAWINGS

FIG. 9 illustrates fine quantized steps for quantizing the DCT coefficients;

FIG. 10 illustrates a block of data having an edge adjacent to a flat area;

FIG. 11 illustrates assumed values of the best matching block for the data block of FIG. 10 that is formed by a motion compensation system;

FIG. 12 illustrates the data differences between the data block of FIG. 10 and the best matching block of FIG. 11;

FIG. 13 illustrates the DCT coefficients that would be derived in response to the differences illustrated in FIG. 12;

FIG. 14 illustrates the quantized value which is the output taken through the quantizer and inverse quantizer utilizing the fine step size of FIG. 9 for quantizing the DCT coefficients of FIG. 13;

FIG. 15 illustrates the results of inversing the effects of the DCT and the quantizer when the quantizer is using the fine steps of FIG. 9;

FIG. 16 illustrates the recovered data block when the quantizer uses the fine steps of FIG. 9;

FIG. 17 illustrates the difference between the recovered data block of FIG. 16 and the input data block values of FIG. 10;

FIG. 18 illustrates coarse quantized steps for quantizing the DCT coefficients;

FIG. 19 illustrates the quantized value which is the output taken through the quantizer and inverse quantizer utilizing the coarse step size of FIG. 18 for quantizing the DCT coefficients of FIG. 13; 15 FIG. 20 illustrates the results of inversing the effects of the DCT and the quantizer when quantizer is using the coarse steps of FIG. 18;

FIG. 21 illustrates the recovered data block when the quantizer uses the coarse steps of FIG. 18;

FIG. 22 illustrates the differences between the recovered data block of FIG. 21 and the input data block of FIG. 10.

DETAILED DESCRIPTION OF THE INVENTION

Figure 1:
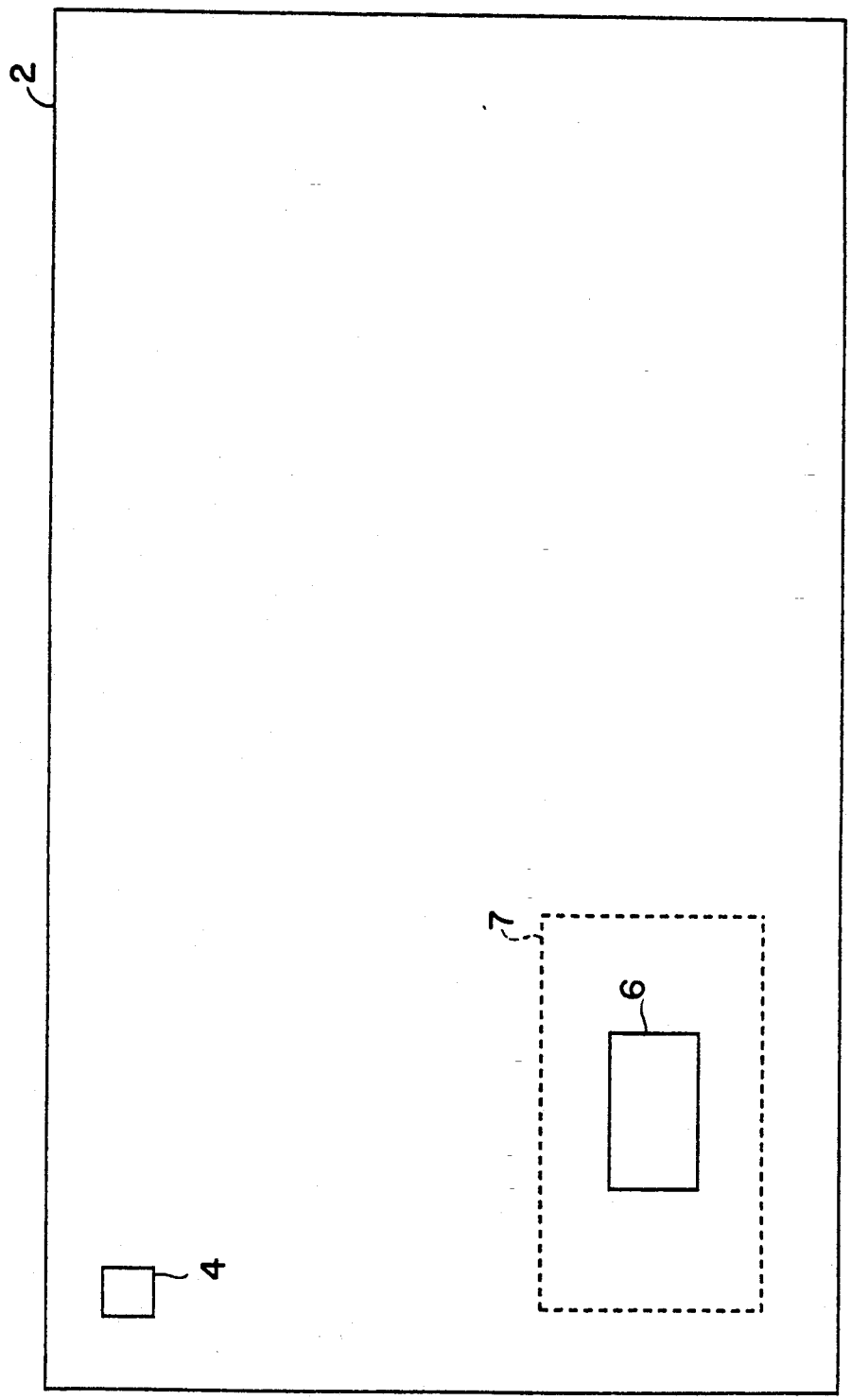
FIG. 1 identifies the blocks of data and areas involved in this invention.

Before describing an interframe hybrid coding system having motion compensation with which this invention may be used, reference is made to FIG. 1 for a definition of certain terms that will be used. A frame 2 is divided into a plurality of contiguous data blocks such as indicated at 4 that may only be eight by eight pixels. A current frame is divided into a number of contiguous motion blocks 6, which may be the same size as the data blocks 4. A search is made to find blocks within the previous frame that lie within a search area 7, including a block like the motion block that is located in a corresponding position in the previous frame. This will derive motion vectors indicating the x, y movement required for the matching block to reach the motion block.

Figure 2:
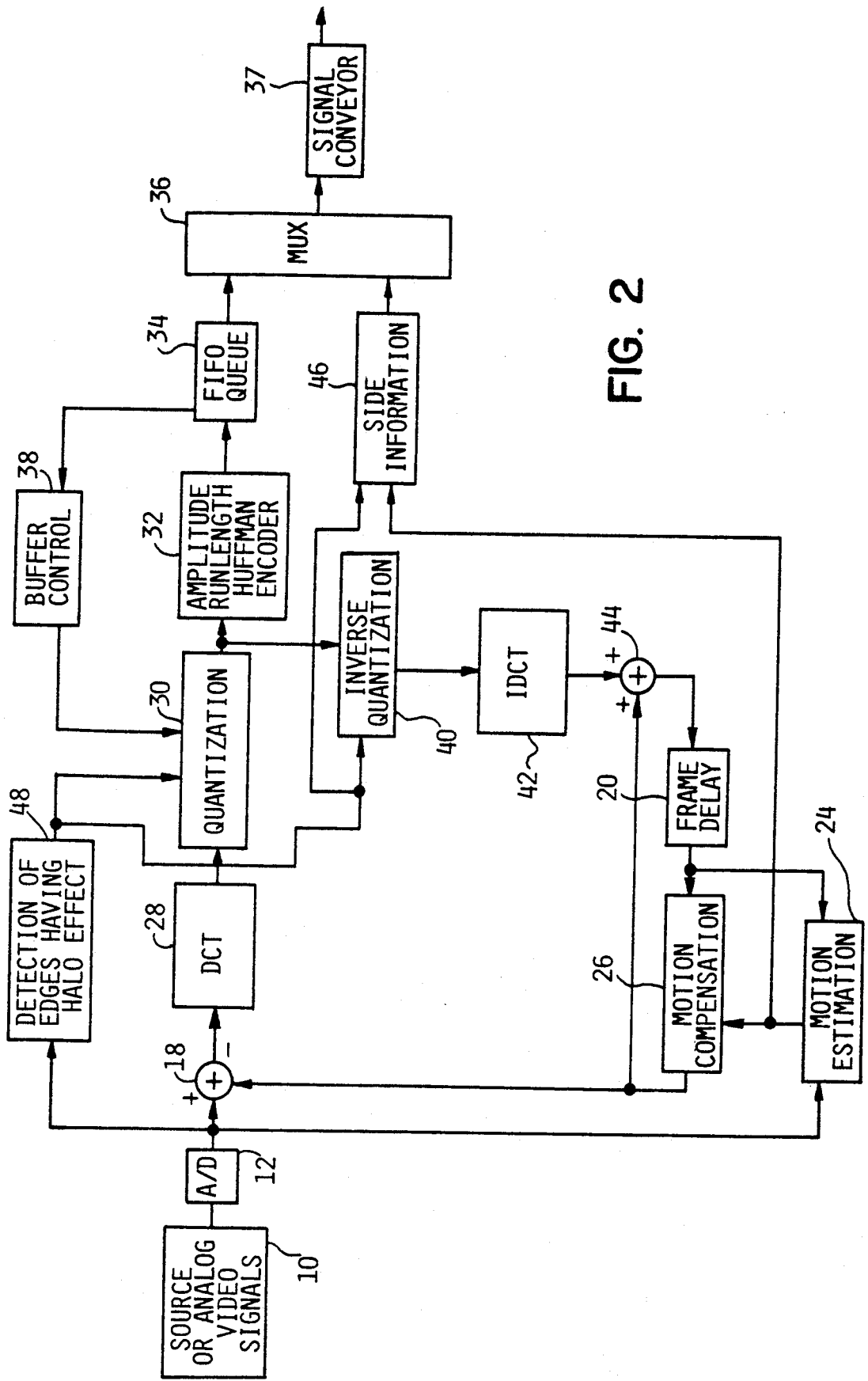
FIG. 2 is a block diagram of an encoder utilizing this invention.

In the encoder shown in FIG. 2, analog signals from a source 10 are converted to digital form by an A/D device 12. Each data block of pixels in the digital video is read into the + input of a subtracter 18. The last frame is stored in a frame delay 20, and each motion block in the current frame is compared in a motion estimation means 24 with blocks within a search area surrounding coordinate position of the motion block in the digitized video input. In this embodiment, it is assumed that the motion blocks have the same size as the data blocks, but this is not necessary. The motion estimation means 24 produces the x, y motion vectors indicating the x, y movements a matching block in the last frame stored in the frame delay 20 must make in order to arrive at the position of the motion block in the current frame. A motion compensation means 26 reads the motion blocks from the frame delay 20 and forms a predicted frame in response to the x, y motion vectors.

As each data block in the digitized video input is scanned so as to supply successive pixel signals to the + input of the subtracter 18, the corresponding data block in the predicted frame is scanned so as to convey corresponding pixel signals to the − input of the subtracter 18. The differences between the pixel signals are applied to a DCT 28 to get the DCT coefficients for the data block. At this point there is no reduction in bits and therefore no reduction in bit rate.

The coefficients in the DCT 28 are converted into a series string by zigzag scanning and are applied to a quantizer 30 because the coefficients in the DCT are more finely quantized than can be resolved by the human visual system. Bit rate reduction is achieved by running the quantized coefficients in series through an amplitude and run length Huffman encoder 32, and its output is coupled via a FIFO queue 34 to one input of a multiplexer 36. Due to varying image content, the rate at which bits arrive at the FIFO queue 34 may vary, but they leave it at a constant rate. If the queue 34 approaches a full condition, a buffer control 38, increases the steps used by the quantizer 30. A means 37, which may be a conductor or a transmitter, conveys the signals at the output of the multiplexer 36 to a desired remote point.

An inverse quantization means 40 is coupled to the output of the quantizer 30 so as to restore the signal to its condition at the input of the quantizer 30 except for the losses of information that necessarily occur because of the quantizing process. Similarly, an IDCT 42 coupled to the output of the inverse quantizer 40, recovers, except for the quantization loss, the difference signals that appeared at the output of the subtracter 18. This stream of difference signals is applied to an adder 44 where it is combined with corresponding pixels from the predicted frame provided by the motion compensation means 26 to produce a frame that is stored in the frame delay 20 that is, as will be seen, the image that will be produced by the receiver from the difference signals appearing at the output of the FIFO queue 34 and x, y motion vectors that are supplied from the motion estimator 24 to the multiplexer 36 by a side information channel 46. When the next current frame arrives, the frame in the frame delay 20 will be the last or previous frame.

In accordance with this invention, a means 48 for detecting edges having a halo effect provides a signal that causes the quantization steps of the quantizer 30 to be smaller in the data blocks involved. As will be illustrated, this reduces or eliminates the halo in images reproduced by a receiver. Information as to such a change in the size of the quantization steps is conveyed to the inverse quantization means 40 via the side information channel 46 and the multiplexer 36.

Figure 3:
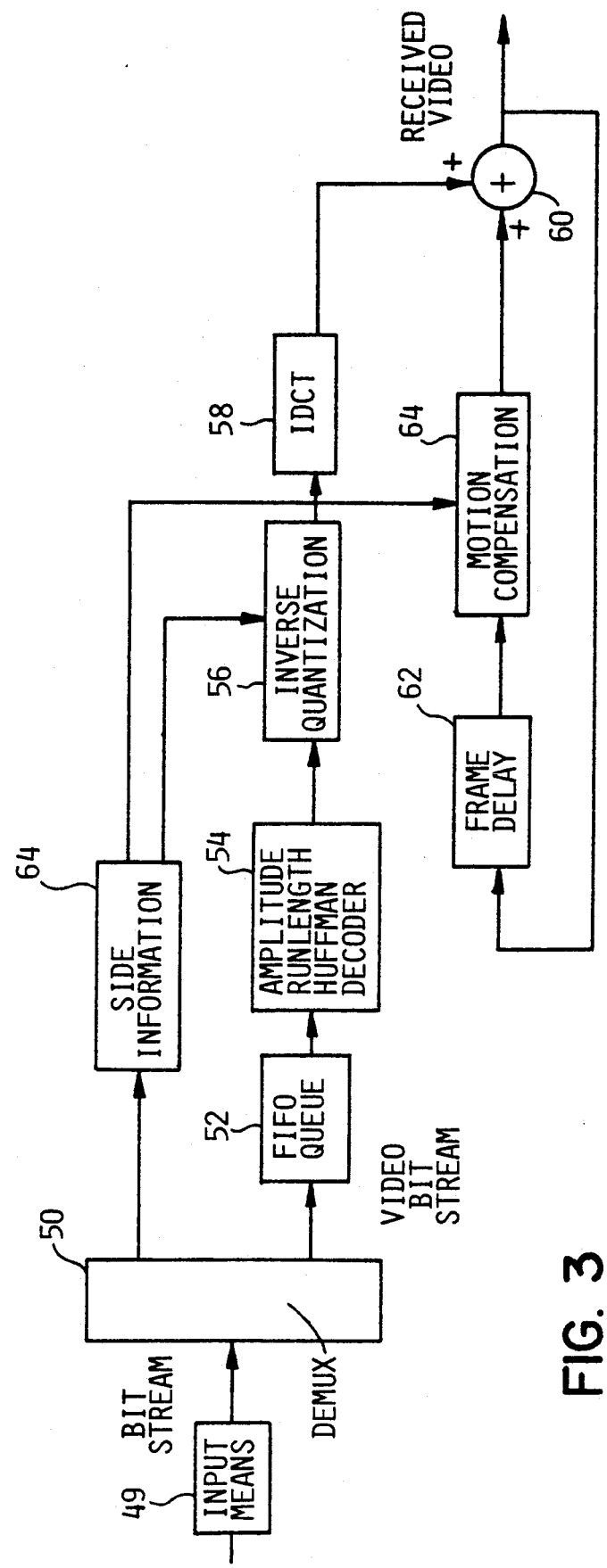
FIG. 3 is a block diagram of a decoder that utilizes this invention.

At a decoder shown in FIG. 3, the bit stream at the output of the multiplexer 36 that is conveyed by the signal conveyor 37 is received by an input means 49 and applied to a demultiplexer 50. The video bit stream at the output of the FIFO queue 34 of the encoder of FIG. 2 is supplied to a FIFO queue 52 that is connected to an amplitude runlength Huffman decoder 54, an inverse quantization means 56 and an IDCT 58 that are connected in series. The difference signals at the output of the IDCT 58 are applied to one input of an adder 60, and its output is connected to a frame delay 62 which stores the last frame.

A side information channel 64 is coupled to receive from the demultiplexer 50 the signals at the output of the side information channel 46 of FIG. 2. The motion vectors are supplied to a motion compensation means 64 so that it can form a predicted frame from the last frame stored in the frame delay 62. Since the signals from the IDCT 58 are the differences between the predicted frame and the current frame, their addition to the predicted frame supplied by the motion compensation means 64 produces the current frame at the output of the adder 60. This frame is stored in the frame delay 62 and becomes the last frame the next time around.

If edges having a halo effect are detected by the detection means 48 of FIG. 2, the information it supplies as to this fact appears at the output of the side information channel 64 in FIG. 3 and is conveyed to the inverse quantization means 56 so that the quantization steps it uses will have the same size as the quantization steps in the quantizer 30 of FIG. 2.

In the beginning and periodically, the frame delays 20 and 62 are cleared and the predicted frames are erased so that the differences in output by the subtracter 18 of FIG. 2 will be the first encoded frame, and it will be stored in the frame delays 20 and 62 as the previous frame for the next encoded frame.

Figure 4:
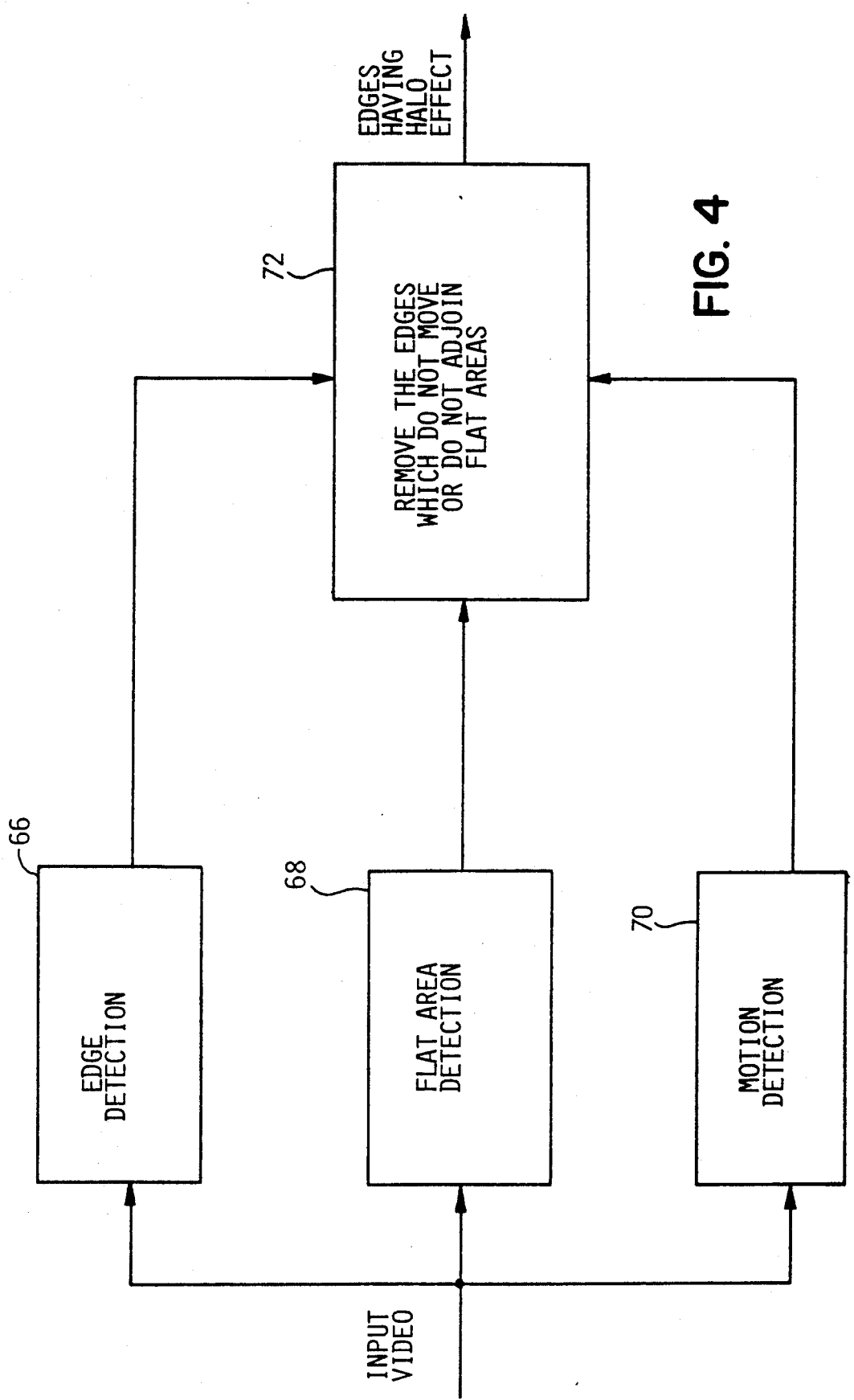
FIG. 4 is a block diagram illustrating one form of a portion of FIG. 3 that carries out this invention.

Reference is made to FIG. 4 for a description of a preferred form of the means 48 in FIG. 2 for detecting edges having a halo effect. Digital video signals from the A/D 12 of FIG. 2 are applied to an edge detection means 66, a flat area detection means 68 and a motion detection means 70. When they respectively give indications of the presence of an edge, the existence of a flat area adjacent the edge and an indication that the edge is in motion, a means 72 removes all edges that are not moving or if moving do not have an adjacent flat area, and supplies information as to the other edges which are those having a halo effect.

Figure 5:
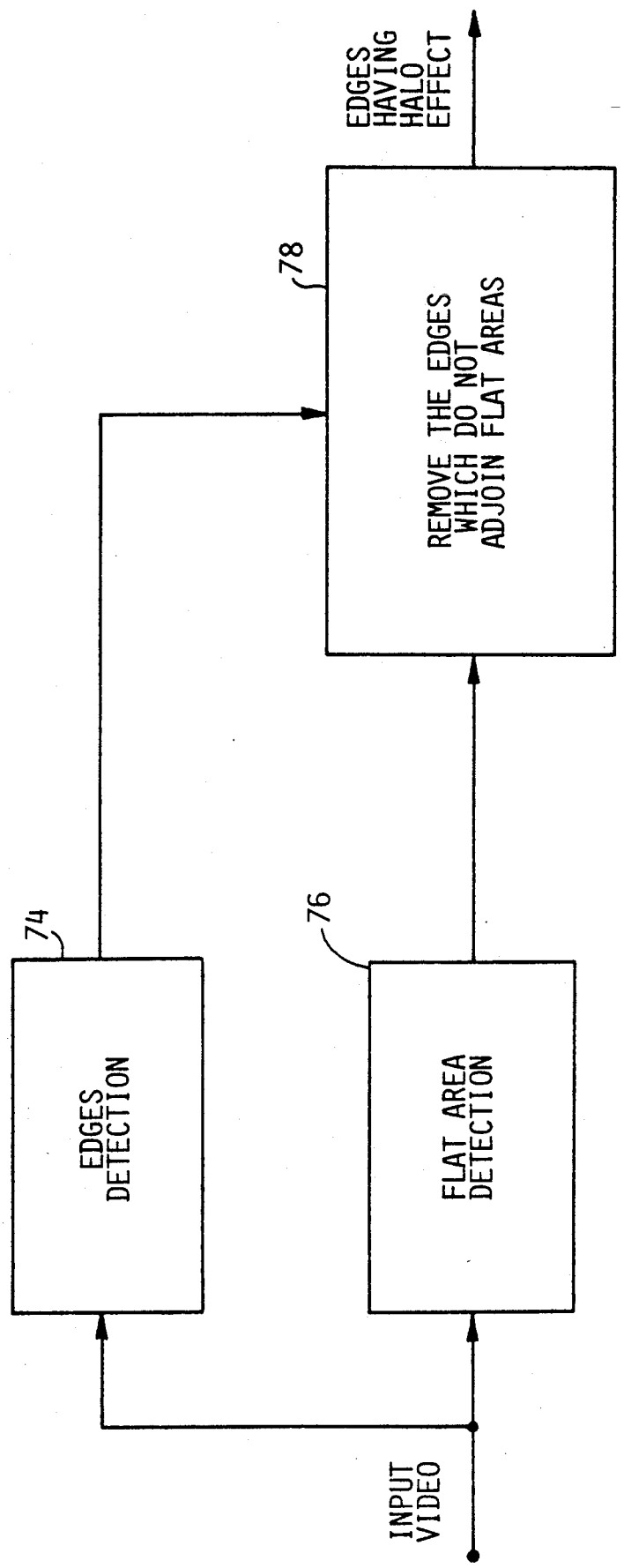
FIG. 5 is a block diagram illustrating another form of a portion of FIG. 3 that carries out this invention.

FIG. 5 shows an alternative detection means that may be used for the situation where there is little noise. The video signal is applied to an edge detection means 74 and flat area detection means 76, and their indications are applied to means 78 for removing all edges that do not adjoin flat areas. Thus, there is no indication of motion so that all edges adjoining a flat area are indicated as having a halo effect. This means that some edges that do not have a halo effect will be treated as through they do so as to initiate the use of smaller quantization steps in the quantizer 30, but as previously mentioned this does not significantly increase the number of bits required.

The indications provided by the edge indication means 66, the flat area detection means 68 and the motion detection means 70 as well as the indications of the edge detection means 74 and flat area detection means 76 are for data blocks.

Figures 6, 8A:
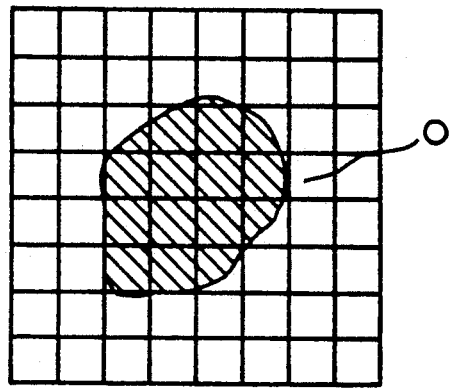
FIGS. 6, 6A, 6B and 6C relate to a way of indicating whether or not a block of data defines an edge.
FIG. 8A is used in explaining a way of determining whether a data block defining an edge is adjacent to a flat area.
Figure 6A:
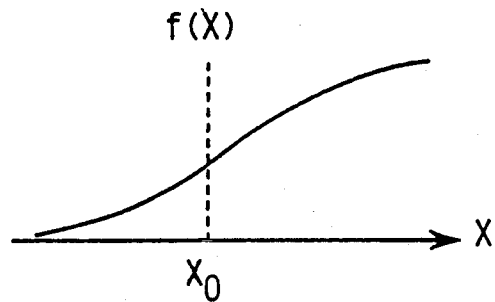
Figure 6B:
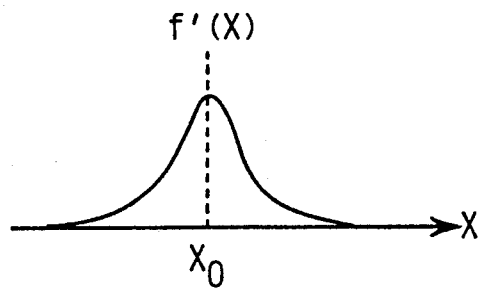
Figure 6C:
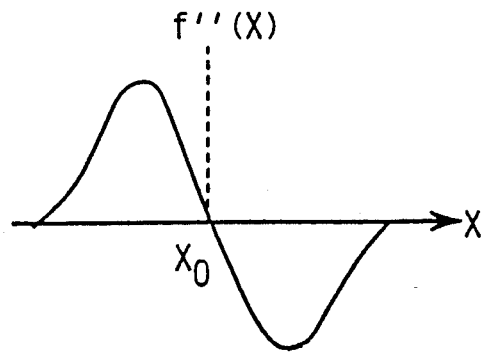

Although there are a number of known ways for detecting an edge, reference is made to FIG. 6 for an explanation of a way that has worked well. FIG. 6 shows a square data block having eight pixels on a side so that there is a total of sixty four. Assume that there is only one object in the data block as indicated at 0 and that it is desired to identify the pixels through which the edge of the object 0 passes. As discussed in chapter 8 of a book by Jae S. Lim entitled "Two Dimensional Signal and Image Processing", Prentice Hall, 1990, an edge can be located along a line at the point where the second differential passes through zero. Thus, if the video signal for one edge of the object 0 as seen along a row of pixels is as shown in FIG. 6A, its first differential is as shown in FIG. 6B and its second differential is as shown in FIG. 6C. The point where the second differential passes through zero is seen to coincide with the edge. This same technique can be applied to the columns of pixels and a pixel where the vector sum of the second differentials along a row and a column passes through zero is a pixel through which the edge passes. This is done for all rows and columns of pixels in the data block, and if a number of pixels, such as six pixels, have an edge passing through them, the data block is indicated as having an edge, otherwise it is not.

The detection of flat areas 68 and 76 can be achieved by measuring the flatness of the data block, such as using the criterion like ac energy. However, if we consider an area without edges as flat area, then the data blocks without edge detected above are flat areas.

Figure 7:
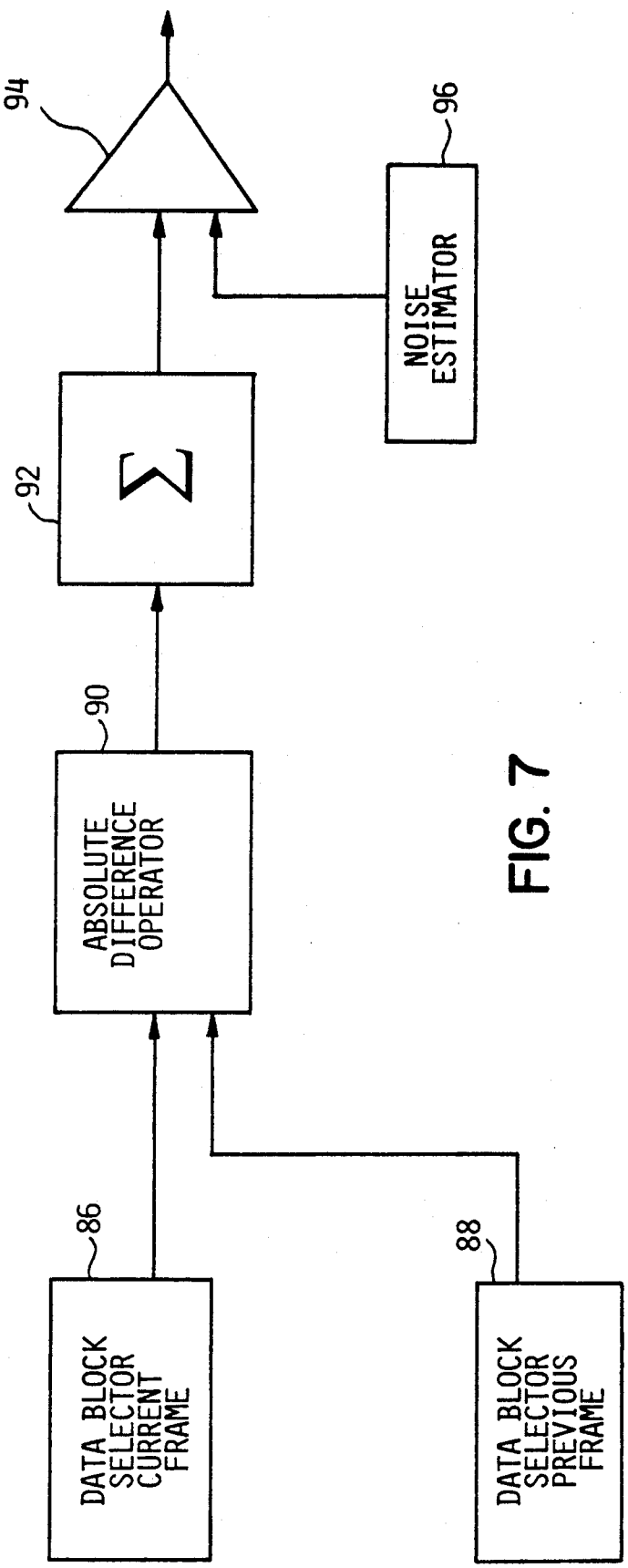
FIG. 7 is a block diagram of a circuit for indicating whether or not a block of data is the result of motion.

Whereas determination as to whether a given data block is moving can be done in many ways, a simple and effective way is illustrated in FIG. 7 in which means 86 provides a given data block from the current frame and means 88 provides the data block from the previous frame. As the absolute differences of corresponding pixels are derived by applying pixels of the current frame and corresponding pixels from the previous frame to the absolute difference operator 90, they are applied to a summer 92 which produces the sum of the differences for a data block. Its output could be used directly as an indication as to whether the particular data block is moving.

If there is no motion, the output of the summer 92 would theoretically be zero, but because of noise, this might not be the case. Therefore, one input of a comparator 94 is connected to the output of the summer 92, and its other input is connected to a noise estimator 96. When the output of the summer exceeds the signal provided by the noise estimator 96, the output of the comparator 94 will be the indication of motion.

Derivation of an indication that there is a flat area adjacent a data block may be accomplished in the following way. FIG. 8A shows a current data block 98 surrounded by data blocks 100, 102, 104, 106, 108, 110, 112 and 114. Indications are first derived as to whether each data block has an edge or is a flat area. If a data block like 98 is indicated as having an edge, the surrounding eight data blocks are addressed to see if they are indicated as being flat area. If any of the surrounding data blocks are indicated as representing flat fields, the current data block is a block for which the quantization steps would be reduced in size if the apparatus is like that of FIG. 5. But, if the apparatus of FIG. 4 is used there will have to be an additional indication that there is motion in the central block before the size of the quantization steps are reduced. It would also be possible to reverse the procedure and search for data blocks around a block indicated as being a flat area that have an edge.

Figure 8B:
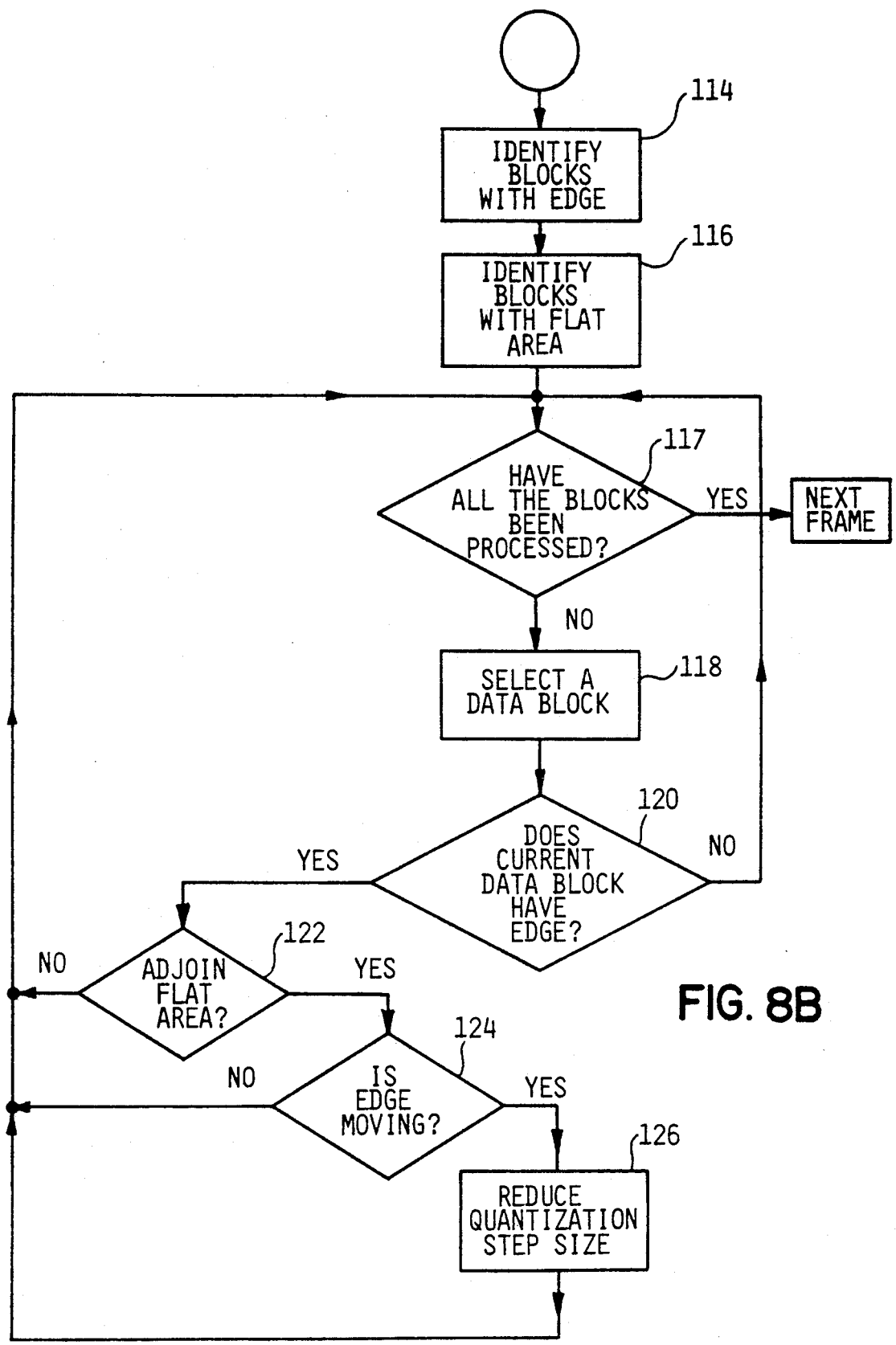
FIG. 8B is a flow chart of a method for deriving an indication as to whether a data block defining an edge is adjacent to a flat area.
Figure 23:
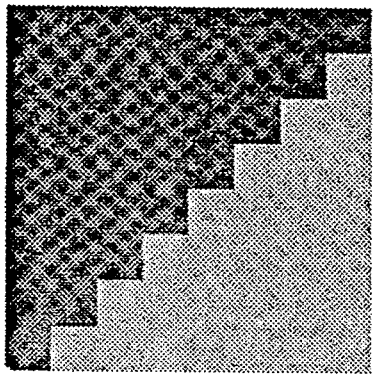
FIG. 23 is a pictorial representation of the data block of FIG. 10.
Figure 24:
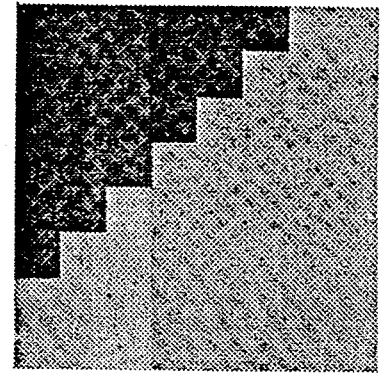
FIG. 24 is a pictorial representation of the best matching block of FIG. 11.
Figure 25:
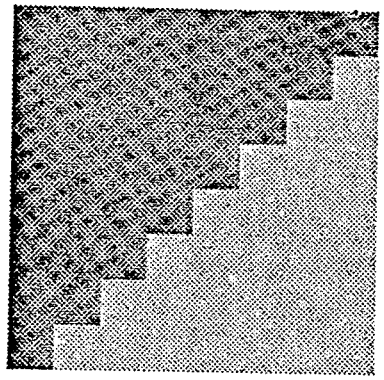
FIG. 25 is a pictorial representation of the reconstructed data block of FIG. 16.
Figure 26:
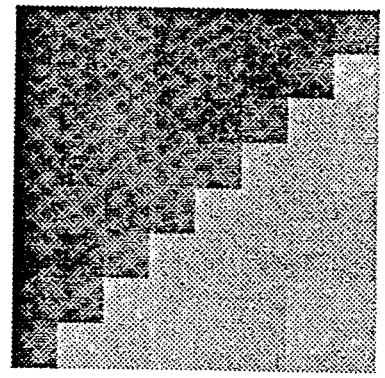
FIG. 26 is a pictorial representation of the reconstructed data block of FIG. 21.

The flow chart of FIG. 8B indicates the procedure followed in the apparatus of FIG. 4. Data blocks having an edge are identified, block 114, and data blocks having a flat area are identified, block 116. This can be done in either order. A determination is made, block 117, as to whether all blocks have been processed. A block is selected, block 118. A decision block 120 determines whether the selected block has an edge. If not, return to block 117. If so, a decision block 122 determines whether there is an adjacent data block with a flat area. If not, return to block 117. If so, proceed to decision block 124 to see if edge is moving. If not, revert to block 117. If so, reduce quantization step size, block 126, and then return to block 117 to select another data block. It will be apparent that the decision blocks could be in any order.

If the apparatus of FIG. 5 is used, the decision block 124 is omitted, and a yes indication by the decision block 122 leads to the block 126 for reducing quantization step size.

Reference is made to FIGS. 9–26 illustrating by computer simulation for a single data block as to how this operates when small quantization steps of one are used for every coefficient as indicated in FIG. 9. FIG. 10 shows the pixel amplitudes of an input data block, and FIG. 11 shows an assumed best matching block which is to be used as a prediction. The differences between the respective pixel values of these blocks are shown in FIG. 12, and the DCT output of these differences is shown in FIG. 13. FIG. 14 shows the quantized values of the output of the DCT using the quantization steps of FIG. 9. FIG. 15 shows the inverse of the effects of the DCT and the quantizer, and FIG. 16 is a reconstruction from the data blocks in FIG. 11 and FIG. 15 rounded to an integer. FIG. 17 shows the difference between the input data block of FIG. 10 and the reconstructed block of FIG. 17.

FIG. 18 shows that the quantization of the DCT output is to be in equal step sizes of five. This, of course, does not change the output of the DCT, but when it is quantized in step sizes of five, the quantized values as appear as shown in FIG. 19. The inverse of the effects of the DCT and the quantizer are shown in FIG. 20. The reconstruction of the data block to the nearest integer is shown in FIG. 21, and its differences from the original data block of FIG. 10 are shown in FIG. 22.

By comparing FIG. 22 with FIG. 17, it can be seen that errors resulting from the use of the large quantization steps are much larger than when the small quantization steps are used. Even these large errors would not be noticeable if they occurred in a busy area of the image, but if they occur in a flat area, they are.

FIGS. 23 through 26 are respective pictorial representations of an image of an input block, the image of the best matching block, a reconstructed image block using a fine quantization step size and a reconstructed image using a coarse quantization step.

If the edge is not moving, the block of data predicted by the motion compensation means would be much closer to the data in the data block from which it is subtracted so that the error would be so small as not to be noticeable even in a flat area.

If, however, the edge is moving, the error will not only be larger but it will also be spread over a larger area so as to produce the halo referred to.

It is noted that the embodiment of the invention described herein applies its processing to data blocks. Both the DCT 28 and the quantizer 30 of FIG. 1 process block by block, and the same is true of the processing of FIGS. 4 and 5 that illustrate the improvement of this invention. Indications are made as to whether a block has an edge, whether it is moving and whether there is an adjacent block for a flat area.

The invention can also be used in sub-band coding systems having hybrid coding with motion compensation that utilize quantizing. In this type of system, the data blocks applied to the quantizer are formed by the amplitudes of frequencies derived from the entire frame rather than a block of pixels.

What is claimed:

1. In an interframe hybrid coding system that includes quantization means for quantizing frequency coefficients derived by a two dimensional transform from signals in a selected area with a given step size, the improvement comprising:
    means for providing a first indication if said selected area contains an edge;
    means for providing a second indication if there is a flat area adjacent to said selected area and substantially equal in size to said area; and
    means for reducing the step size used by the quantization means to quantize the coefficients derived from said selected area if said first and second indications are present.

2. In an interframe hybrid coding system that includes quantization means for quantizing frequency coefficients derived by a two dimensional transform from signals in a selected area with a given step size, the improvement comprising:
    means for providing a first indication if said selected area contains an edge;
    means for providing a second indication if there is a flat area adjacent to the edge corresponding to said first indication;

means for providing a third indication if the edge corresponding to said first indication is moving; and means for reducing the step size used by the quantization means if said first, second and third indications are present.

3. In a system for encoding signals the combination of:

a signal terminal;

a subtracter having positive and negative input ports for deriving a difference between respective signals applied to the positive input port and the negative input port and for providing the derived difference signal at an output port;

means for coupling the positive input port of the subtracter to said signal terminal;

transform means having an input port coupled to the output port of said subtracter for deriving a two dimensional block of transform coefficients and for providing the derived coefficients at an output port;

quantizing means having an input port coupled to the output port of said transform means for quantizing the block of transform coefficients with a given step size and for providing the quantized coefficients at an output port;

a data output terminal;

means for coupling the output port of said quantizing means to said data output terminal;

inverse quantizing means having an input port coupled to the output port of said quantizing means for deriving signals representing an inverse quantization of the quantized coefficient and for providing the derived signals at an output port;

inverse transform means having an input port coupled to the output port of said inverse quantizing means for deriving signals representing an inverse transform of the signals provided by the inverse quantizing means and for providing the derived inverse transform signals at an output port;

an adder having a first input port coupled to the output port of said inverse transform means, a second input port for deriving a signal representing a sum of signals provided at the first and second input ports of the adder and for providing the sum signal an output port;

signal storage means, having an input port coupled to the output port of said adder and an output port, for storing signals applied to said input port and for providing the stored signals at said output port;

motion estimation means having a first input port coupled to the output port of said storage means and a second input port coupled to said signal terminal for deriving motion vectors and for providing the derived motion vectors at an output port;

motion compensation means having a first input port coupled to the output port of said motion estimation means and a second input port coupled to the output port of said signal storage means for forming a predicted area and for providing signals representing the predicted area at an output port;

means for coupling the output port of said motion compensation means to the negative input port of said subtracter and to the second input port of the adder;

edge detection means having an input port coupled to said signal terminal for providing a first indication if signals representing a selected area, applied to the input port define an image which contains an edge;

flat area detection means having an input port coupled to said signal terminal for providing a second indication if there is a flat area adjacent to said selected area and substantially equal in size to said selected area;

means for decreasing the step size of the steps used by said quantizing means if said first and second indication occur.

4. In a system for encoding signals the combination of:

a signal terminal;

a subtracter having positive and negative input ports for deriving a difference of respective signals applied to the positive input port and the negative input port at an output port;

means for coupling said positive input port of the subtracter to said signal terminal;

transform means having an input port coupled to the output port of said subtracter for deriving a two dimensional block of transform coefficients and for providing the derived block of transform coefficients at an output port;

quantizing means having an input port coupled to the output port of said transform means for quantizing the block of transform coefficients with a given step size and for providing the quantized block of coefficients at an output port;

a data output terminal;

means for coupling the output port of said quantizing means to said data output terminal;

inverse quantizing means having an input port coupled to the output port of said quantizing means for deriving values representing an inverse quantization of the quantized block of coefficients and for providing the derived values at an output port;

inverse transform means having an input port coupled to the output port of said inverse quantizing means for deriving values representing an inverse transform of the values provided by the inverse quantizing means and for providing the derived inverse transform values at an output port;

an adder having a first input port coupled to the output port of said inverse transform means, a second input port coupled to the negative input port of said subtracter which derives a sum of values applied to the first and second input ports and provides and derived sum an output port;

signal storage means having an input port coupled to the output port of said adder for storing signals applied to the input port and for providing the stored signals at an output port;

motion estimation means having a first input port coupled to the output port of said storage means and a second input port coupled to said signal terminal for deriving motion vectors and for providing the derived motion vectors at an output port;

motion compensation means having a first input port coupled to the output port of said motion estimation means and a second input port coupled to the output port of said signal storage means for forming signals representing a predicted area and for providing said formed signals at an output port thereof;

means for coupling the output port of said motion compensation means to the negative input port of said subtracter;

edge detection means having an input port coupled to said signal terminal for providing a first indication if signals representing a selected area said which are applied to the input port define an edge;

flat area detection means having an input port coupled to said signal terminal for providing a second indication if signals applied to the input port of the flat area detection means represent a flat area which is adjacent to the selected area and substantially equal in size to the selected area;

motion detection means having an input port coupled to said signal terminal for providing a third indication if the edge corresponding to said first indication is moving; and means for reducing the step size used by said quantizing means only if all three indications are present.

5. Apparatus for reducing distortion in an interframe hybrid encoder employing a quantizer which uses a given step size comprising:

means for providing a first indication if signals representing a first area being encoded define an edge;

means for providing a second indication if signals representing a second area, adjacent to the first area, define a flat area; and means for reducing the step size used by said quantizer if said first and second indications are present.

6. Apparatus for reducing distortion in an interframe hybrid image encoder employing a quantizer using a given step size comprising:

edge detection means for providing a first indication if signals being encoded define an edge in the image;

means for providing a second indication if signals being encoded define a flat area in the image, which flat area is adjacent in the image to the edge define by the edge detection means;

means for providing a third indication if the edge corresponding to said first indication is moving in the image from frame to frame; and means for reducing the step size used by said quantizer if said first, second and third indications are present.

7. An improved encoder that includes a quantizer which uses a given step size in processing differences between a data block being encoded and a predicted data block provided by motion compensation apparatus so as to produce encoded signals at its output port, the improvement comprising:

means for providing a first indication if the data block being encoded contains an edge;

means for providing a second indication if a data block adjacent the data block being encoded defines a flat area and is substantially equal in size to the data block being encoded; and means responsive to the presence of said first and second indications for reducing the step size used by said quantizer.

8. An improved encoder that includes a quantizer using a given step size in processing differences between a data block being encoded from a first frame and a predicted data block from a second frame provided by motion compensation apparatus so as to produce encoded signals at its output port, the improvement comprising:

means for providing a first indication if the data block being encoded contains an edge;

means for providing a second indication if a data block adjacent the data block being encoded defines a flat area;

means for providing a third indication if the edge corresponding to said first indication is at respective different positions in the first and second frames; and means responsive to the presence of said first, second and third indications for reducing the step size used by said quantizer.

9. An improved encoder that includes a quantizer using a given step size in processing differences between a data block being encoded and a predicted data block provided by motion compensation means so as to produce encoded signals at its output port, where the motion compensation means includes an inverse quantizer for inverting the effects of the quantizer, the improvement comprising:

means for providing a first indication if the data block being encoded contains an edge;

means for providing a second indication if a data block adjacent the data block being encoded defines a flat area and is substantially equal in size to the data block being encoded;

means responsive to the presence of said first and second indications for reducing the step size used by said quantizer; and means for causing said inverse quantizer to operate with the same reduced step size as said quantizer.

10. An improved encoder that includes a quantizer which used a given step size in processing differences between a data block being encoded from a first frame and a predicted data block provided by motion compensation means from a second frame so as to produce encoded signals at its output port, where the motion compensation means includes an inverse quantizer for inverting the effects of the quantizer, the improvement comprising:

means for providing a first indication if the data block being encoded contains an edge;

means for providing a second indication if a data block adjacent the data block being encoded defines a flat area;

means for providing a third indication if the edge corresponding to said first indication exhibits motion between the first and second frames;

means responsive to the presence of said first, second and third indications for reducing the step size used by said quantizer; and means for causing said inverse quantizer to operate with the same reduced step size as said quantizer.

11. In the encoder as set forth in claim 7, the improvement further comprising:

means for providing a signal at the output port of the encoder indicative of the reduced step size used in the quantizer when said first and second indications are present.

12. In the encoder as set forth in claim 8, the improvement further comprising:

means for providing a signal at the output port of the encoder indicative of the reduced step size used in the quantizer when said first, second, and third indications are present.

13. A coding system, having an encoder, comprising:

a subtracter having positive and negative input ports and an output port;

means for coupling video signals to be encoded to said positive input port of said subtracter;

a discrete cosine transformer (DCT) coupled to the output port of said subtracter;

a quantizer coupled to said DCT operating with a given step size;

an encoder output terminal for said encoder;

means for coupling said encoder output terminal to said quantizer;

an inverse quantizing means coupled to said quantizer operating with the same given step size as said quantizer;

DCT inverter means for inverting the effects of said DCT, said DCT inverter means being coupled to said inverse quantizing means;

a first adder having one input port coupled to said DCT inverter means and another input port coupled to the negative input port of said subtracter and an output port;

a first frame delay coupled to the output port of said first adder;

motion estimation means having one input port coupled to said positive input port of said subtracter and another input pot coupled to said first frame delay for providing data in said first frame delay that matches data at the positive input port of said subtracter and for providing motion vectors at an output port;

first motion compensation means having a first input port coupled to the output port of said motion estimation means and a second input port coupled to said first frame delay for forming a predicted area at an output port;

means for coupling the output port of said first motion compensation means to the negative input port of said subtracter;

edge detection means having an input port coupled to the positive input port of said subtracter for providing a first indication if a first block of data at said positive input port of said subtracter contains an edge and a second indication if there is a second block of data, adjacent to said first block of data, which contains a flat area and said second block of data is substantially equal in size to said first block of data;

step size reduction means responsive to the presence of both of said first and second indications provided by the edge detection means for reducing the given step size at which said quantizer and said inverse quantizing means are operating and for providing a mode signal at an output port indicative of the reduction in the given step size;

means for coupling said motion vectors at the output port of the motion estimation means and said mode signal at the output port of said step size reduction means to the encoder output terminal;

means for conveying signals at the encoder output terminal to a remote point;

input means for receiving signals conveyed from said encoder output terminal to said remote point;

a second adder having first and second input ports and an output port;

means including an inverse quantizer and an inverse DCT coupled between said input means and said first input port of said second adder;

a second frame delay coupled to the output port of said second adder;

second motion compensation means responsive to motion vectors and coupled to said second frame delay for providing data corresponding to the data at the negative input port of said subtracter; and means for coupling said second motion compensation means to the second input port of said second adder.

14. In an interframe hybrid coding system that includes quantization means for quantizing the frequency coefficients from signals in an area with a given step size, the improvement comprising:

means for providing a first indication if said area contains an edge;

means for providing a second indication if there is a flat area adjacent to said area and substantially equal in size to said area; and means for reducing the step size used by the quantization means if said first and second indications are present.

15. An improved interframe hybrid coding method that includes the step of quantizing frequency coefficients, derived by a two dimensional transform from signals in an area, with a given step size, the improvement comprising the steps of:

determining if said area contains an edge and providing a first indication;

determining if there is a flat area adjacent to said area and substantially equal in size to said area and providing a second indication; and reducing the step size used by the quantization means if said first and second indications are present.

16. An improved interframe hybrid coding method that includes the step of quantizing frequency coefficients, derived by a two dimensional transform from signals representing an area, with a given step size, the improvement comprising the steps of:

determining if said area contains an edge and providing a first indication;

determining if there is a flat area next to the edge corresponding to said first indication and providing a second indication;

determining if the edge corresponding to said first indication is moving from frame to frame and providing a third indication; and reducing the step size used by the quantization means if said first, second and third indications are present.

17. A method for reducing distortion in an interframe hybrid encoder which employs a quantizer using a given step size, the method comprising the steps of:

determining if signals in a first area being encoded define an edge and providing a first indication signal;

determining if signals in a second area being encoded define a flat area adjacent to said first area and substantially equal in size to said first area and providing a second indication signal; and reducing the step size used by said quantizer in response to the first and second indication signals.

18. A method for reducing distortion in an interframe hybrid encoder which employs a quantizer using a given step size, the method comprising the steps of:

determining if signals being encoded define an edge to provide a first indication signal;

determining if signals being encoded define a flat area adjacent to the edge to provide a second indication signal;

determining if the edge corresponding to said first indication signal is in motion from frame to frame to provide a third indication signal; and reducing the step size used by said quantizer in response to the first, second and third indication signals.

19. An improved encoder that includes a quantizer which uses a given step size in processing a data block to be encoded, the improvement comprising:
  means for determining if the data block being encoded contains an edge to provide a first indication signal;
  means for determining if a data block, adjacent to the data block being encoded and being substantially equal in size to the data block being encoded, defines a flat area to provide a second indication signal; and
  means responsive to the first and second indication signals for reducing the step size used by the quantizer.

* * * * *